US010308233B2

(12) United States Patent
Johri et al.

(10) Patent No.: US 10,308,233 B2
(45) Date of Patent: Jun. 4, 2019

(54) METHODS AND SYSTEM FOR ESTIMATING DRIVELINE TORQUE OF A HYBRID VEHICLE

(71) Applicant: Ford Global Technologies, LLC, Dearborn, MI (US)

(72) Inventors: Rajit Johri, Canton, MI (US); Jeffrey Allen Doering, Canton, MI (US); Ming Lang Kuang, Canton, MI (US); Xiaoyong Wang, Novi, MI (US); Mark Steven Yamazaki, Canton, MI (US); Jason Meyer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 42 days.

(21) Appl. No.: 15/016,588

(22) Filed: Feb. 5, 2016

(65) Prior Publication Data

US 2017/0225670 A1 Aug. 10, 2017

(51) Int. Cl.
*B60W 20/10* (2016.01)
*B60K 6/387* (2007.10)
*B60W 10/06* (2006.01)
*B60W 10/02* (2006.01)
*B60W 10/08* (2006.01)
(Continued)

(52) U.S. Cl.
CPC ............. *B60W 20/10* (2013.01); *B60K 6/387* (2013.01); *B60W 10/02* (2013.01); *B60W 10/06* (2013.01); *B60W 10/08* (2013.01); *B60W 50/0097* (2013.01); *B60W 50/06* (2013.01); *B60W 2050/0056* (2013.01); *B60W 2510/0628* (2013.01); *B60W 2510/0638* (2013.01); *B60W 2510/083* (2013.01); *B60W 2540/00* (2013.01); *B60W 2540/10* (2013.01); *B60W 2710/021* (2013.01); *B60W 2710/0666* (2013.01); *B60W 2710/083* (2013.01); *B60Y 2200/92* (2013.01); *B60Y 2300/42* (2013.01); *B60Y 2300/43* (2013.01); *B60Y 2300/60* (2013.01); *B60Y 2400/426* (2013.01); *Y10S 903/914* (2013.01); *Y10S 903/93* (2013.01)

(58) Field of Classification Search
CPC ...... B60W 20/10; B60W 10/02; B60W 10/08; B60W 10/06; B60W 2710/083; B60W 2710/0666; B60W 2050/0056; B60W 2510/083; B60K 6/387; B60Y 2300/60; B60Y 2200/92; B60Y 2400/426; B60Y 2300/42; Y10S 903/914
See application file for complete search history.

(56) References Cited

U.S. PATENT DOCUMENTS 6,053,843 A * 4/2000 Van Vuuren .......... B60W 10/06
477/109
6,316,904 B1 11/2001 Semenov et al.
(Continued)

*Primary Examiner* — Hussein Elchanti
*Assistant Examiner* — Majdi Alsomiri
(74) *Attorney, Agent, or Firm* — David Kelley; McCoy Russell LLP

(57) ABSTRACT

Systems and methods for operating a hybrid powertrain that includes an engine and a motor/generator are described. The systems and methods align in time an estimated motor torque and an actual motor torque to provide an estimated driveline torque. The alignment compensates for communications delays between different controllers over a controller area network.

17 Claims, 6 Drawing Sheets

(51) Int. Cl.
  *B60W 50/00* (2006.01)
  *B60W 50/06* (2006.01)

(56) References Cited

U.S. PATENT DOCUMENTS

| | | | | |
|---|---|---|---|---|
| 6,561,949 | B2* | 5/2003 | Janson | B60W 10/06 |
| | | | | 192/21.5 |
| 6,683,428 | B2 | 1/2004 | Pavlov et al. | |
| 7,644,812 | B2* | 1/2010 | Simpson | F16H 61/62 |
| | | | | 192/3.26 |
| 8,378,605 | B2 | 2/2013 | Wang et al. | |
| 8,596,390 | B2* | 12/2013 | Soliman | B60K 6/442 |
| | | | | 180/65.21 |
| 2004/0007995 | A1* | 1/2004 | Fu | H02P 21/22 |
| | | | | 318/400.02 |
| 2005/0252283 | A1* | 11/2005 | Heap | B60K 6/365 |
| | | | | 73/115.02 |
| 2009/0118078 | A1 | 5/2009 | Wilmanowicz et al. | |
| 2009/0145673 | A1* | 6/2009 | Soliman | B60K 6/442 |
| | | | | 180/65.1 |
| 2010/0145559 | A1* | 6/2010 | Gauthier | B60K 6/445 |
| | | | | 701/22 |
| 2012/0283921 | A1 | 11/2012 | Wilmanowicz et al. | |
| 2013/0151044 | A1 | 6/2013 | Lee | |
| 2013/0296123 | A1* | 11/2013 | Doering | B60W 10/02 |
| | | | | 477/5 |
| 2013/0296125 | A1* | 11/2013 | Gibson | B60W 20/10 |
| | | | | 477/5 |
| 2013/0296132 | A1* | 11/2013 | Doering | B60K 6/48 |
| | | | | 477/86 |
| 2013/0296136 | A1* | 11/2013 | Doering | B60K 6/48 |
| | | | | 477/167 |
| 2013/0297122 | A1* | 11/2013 | Gibson | B60W 20/40 |
| | | | | 701/22 |
| 2015/0051045 | A1* | 2/2015 | Gibson | B60W 10/02 |
| | | | | 477/5 |
| 2015/0151739 | A1* | 6/2015 | Park | B60W 20/50 |
| | | | | 701/54 |

* cited by examiner

US 10,308,233 B2

METHODS AND SYSTEM FOR ESTIMATING DRIVELINE TORQUE OF A HYBRID VEHICLE

FIELD

The present description relates to methods and a system for operating a powertrain of a hybrid vehicle. The methods and systems may be particularly useful for hybrid vehicles that provide wheel torque via an engine and motor positioned along a shaft providing input to a transmission.

BACKGROUND AND SUMMARY

A hybrid vehicle may include more than one controller to operate various devices. For example, a hybrid vehicle may include a vehicle system controller that communicates between an engine controller, a motor controller, a vehicle brake controller, and a transmission controller. The vehicle system controller may communicate with the other various controllers over a controller area network (CAN). The communication may include sending values of various control variables from the vehicle system controller to the various controllers and receiving values of various control variables to the vehicle system controller from the various controllers. However, because values of communicated control variables may be dynamic, it may be possible for values of some control variables used to operate the various controllers to be different than the actual value of the control variable. Consequently, disturbances in vehicle operation may occur.

The inventors herein have recognized the above-mentioned issues and have developed a powertrain operating method, comprising: estimating a motor torque based on a requested motor torque and a communications delay between a source requesting motor torque and a motor torque controller; adding the estimated motor torque to an estimated engine torque to estimate driveline torque; and adjusting a driveline actuator responsive to the estimated driveline torque.

By compensating for a communications time delay between a first controller requesting motor torque and a second controller that controls motor torque, it may be possible to provide the technical result of improved driveline torque estimation so that control of actuators that are adjusted based on the driveline torque estimate may be improved. For example, motor torque and engine torque delivery may be improved to meet a desired driveline torque. Further, shifting gears of a transmission may be improved by responding to a more accurate driveline torque estimate.

The present description may provide several advantages. Specifically, the approach may provide for smaller driveline torque disturbances. Further, the approach may improve actuator operation by providing timely commands to actuators. Additionally, the approach may improve transmission shifting and the accuracy of providing a desired driver demand torque via the motor and the engine.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
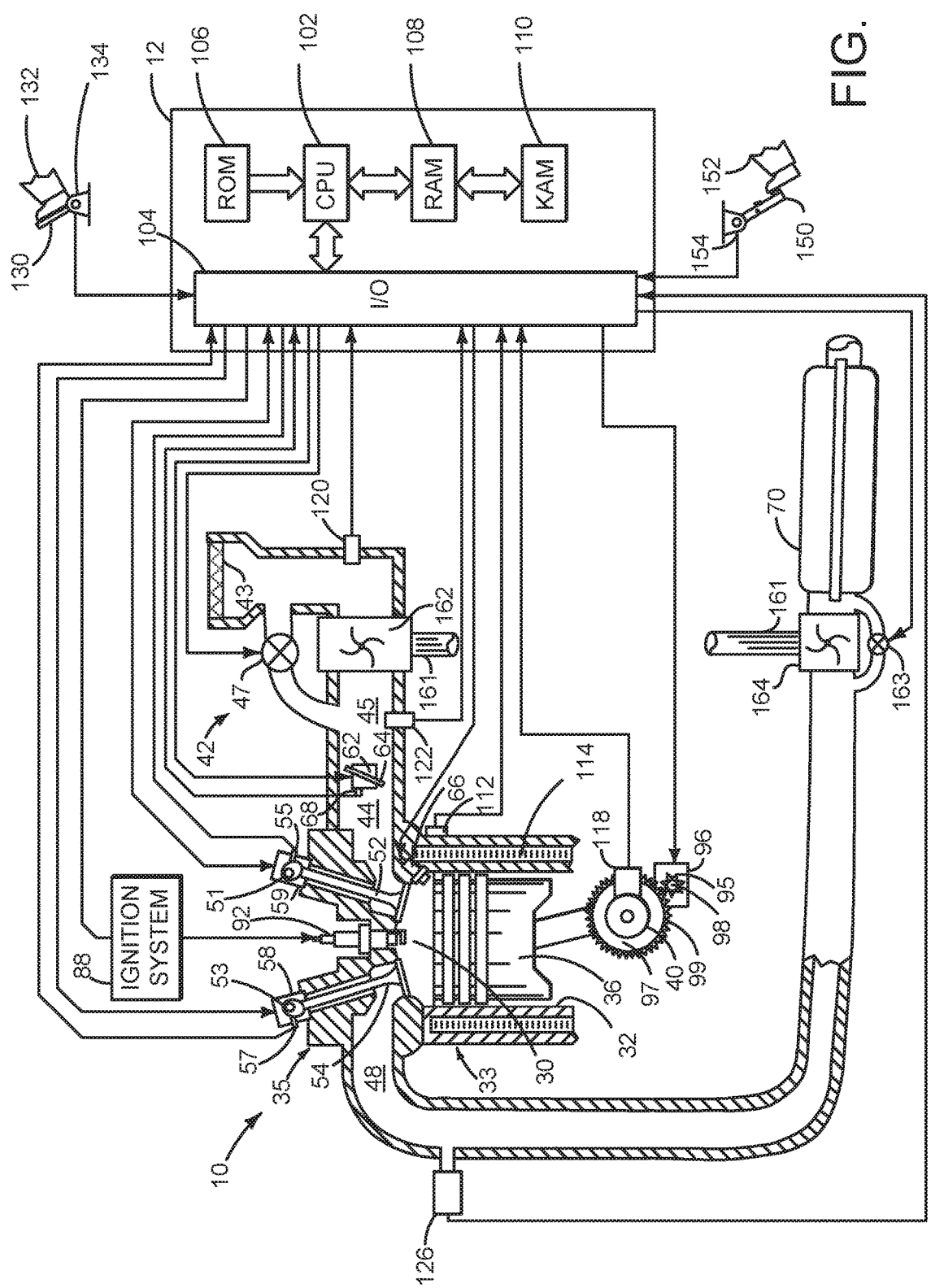
FIG. 1 is a schematic diagram of an engine.
Figure 2:
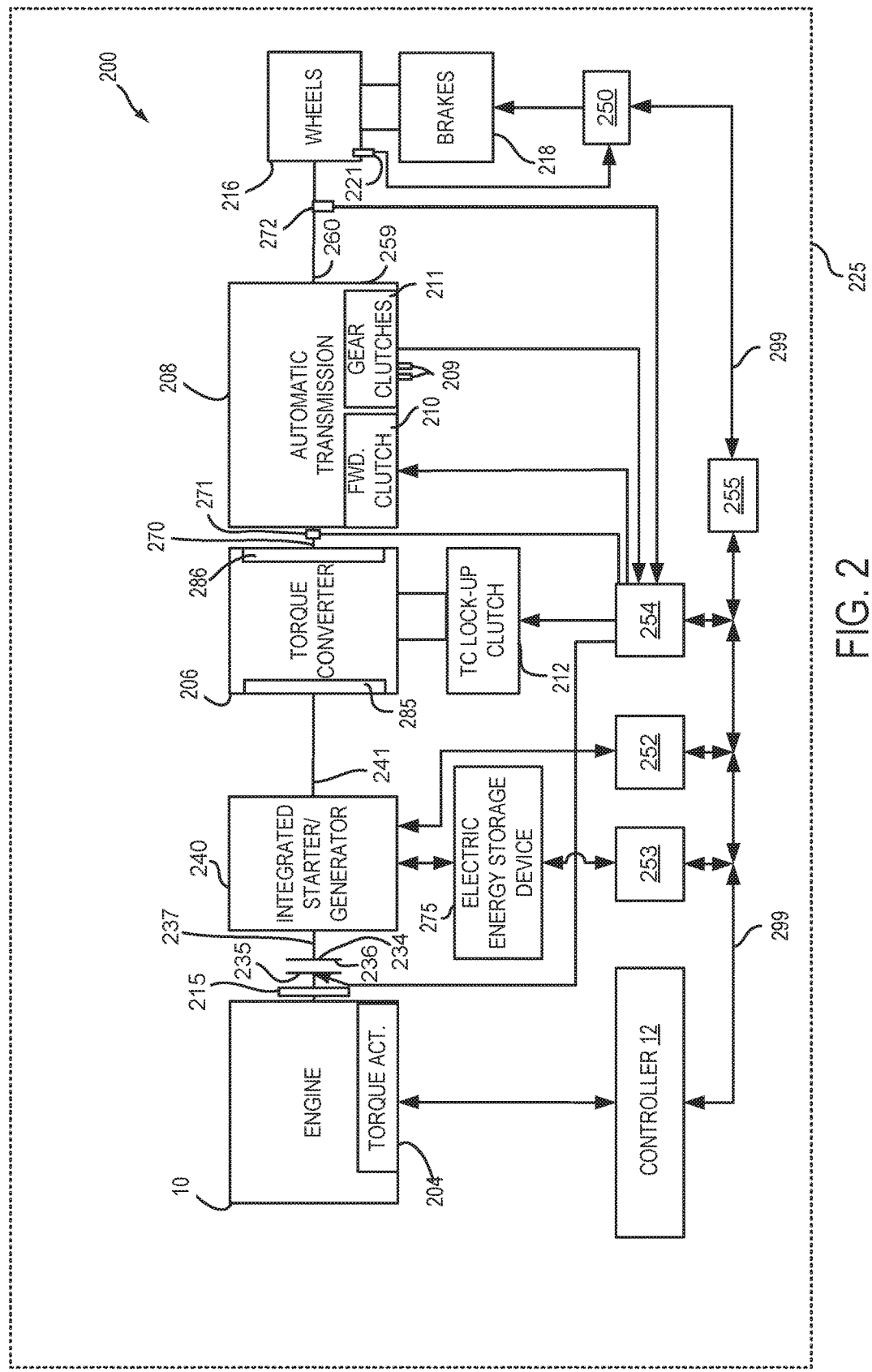
FIG. 2 is a schematic diagram of a hybrid vehicle powertrain.
Figure 3:
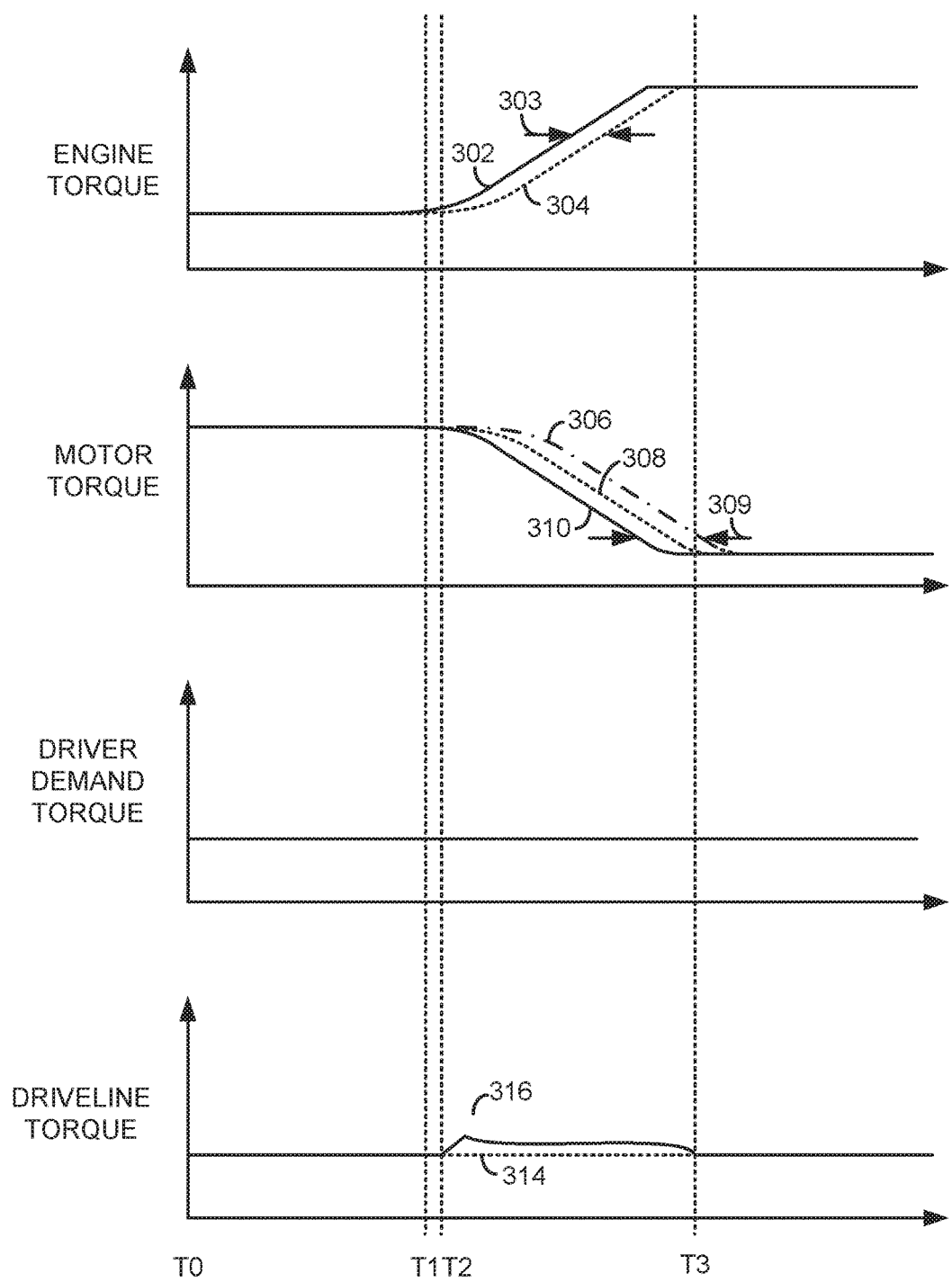
FIG. 3 is a plot showing uncompensated driveline torque control.
Figure 4:
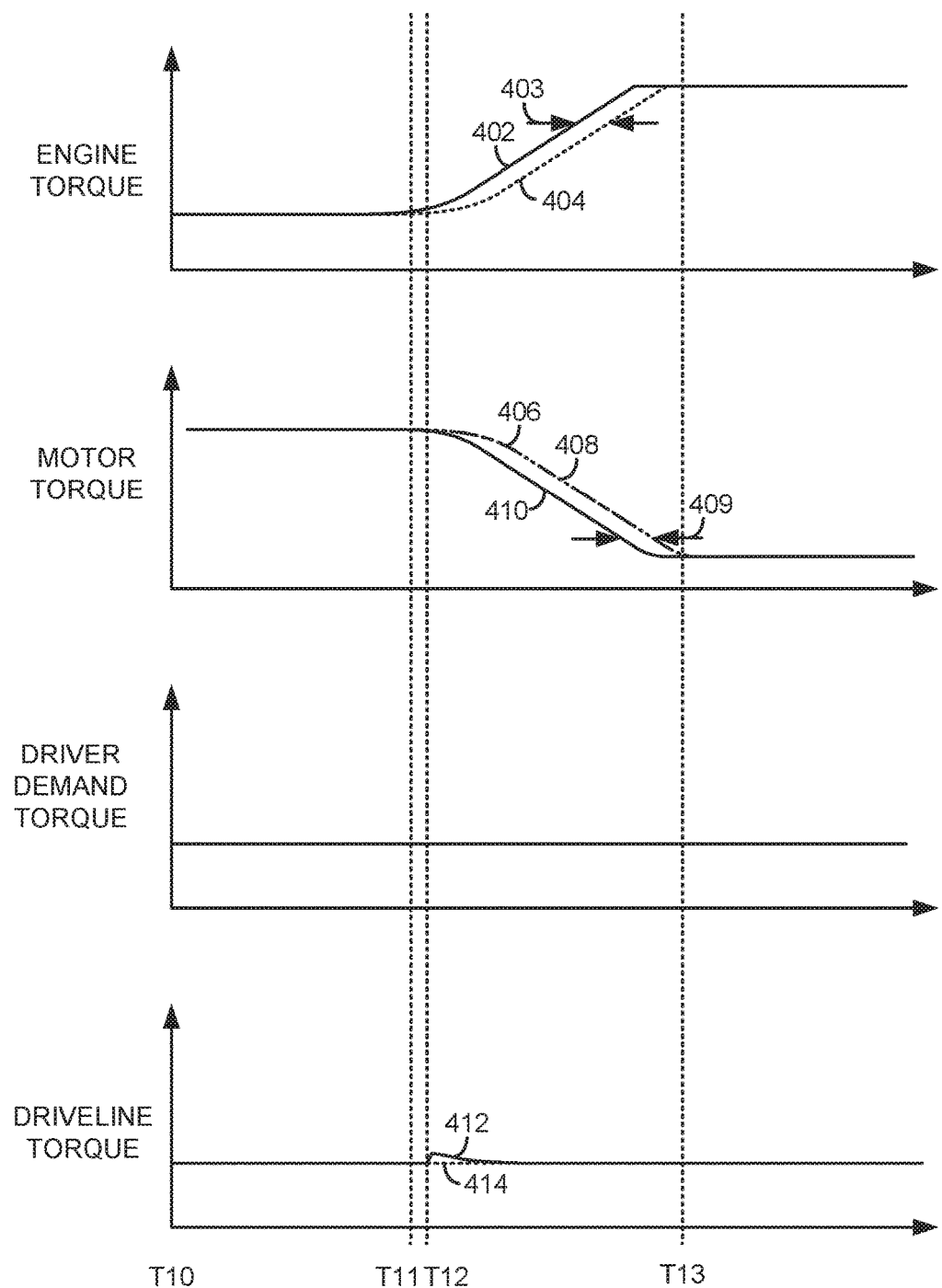
FIG. 4 is a plot showing compensated driveline torque control.
Figure 5:
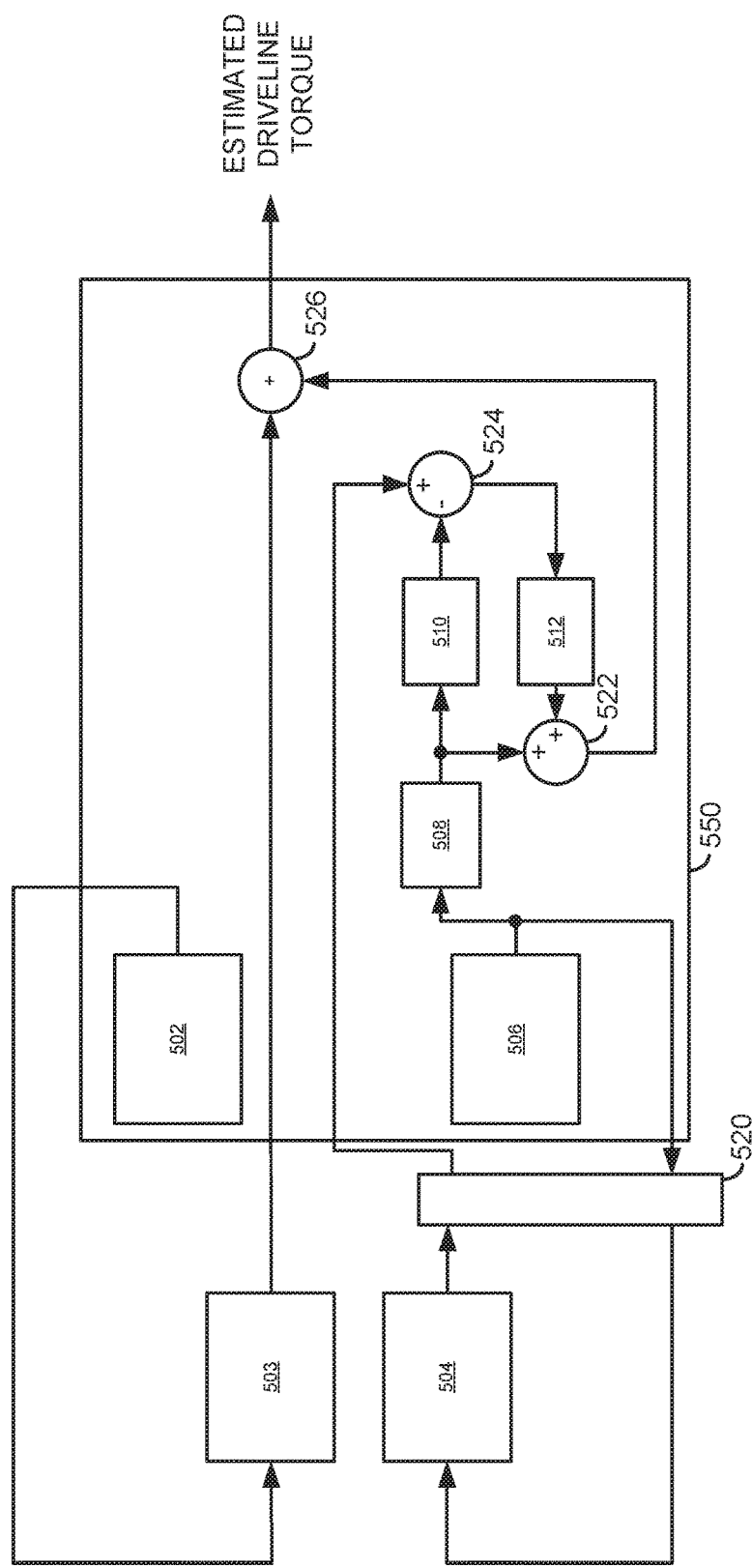
FIG. 5 is an example control block diagram for driveline torque control compensation.

The present description is related to operating an engine and a motor of a hybrid vehicle. Driveline torque is compensated for delays that may be present over a communications network. The hybrid vehicle may include an engine as is shown in FIG. 1. The engine of FIG. 1 may be included in a powertrain as is shown in FIG. 2. Uncompensated driveline torque produced via an engine and motor may be as is shown in FIG. 3. Compensated driveline torque produced via the engine and the motor may be as is shown in FIG. 4. A block diagram of one example controller is shown in FIG. 5. The hybrid vehicle may operate according to the flowchart shown in FIG. 6.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a first braking torque from electric machine controller 252 and a second braking torque from brake controller 250, the first and second torques providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand alone controllers.

In this example, powertrain 200 may be powered by engine 10 and electric machine 240. In other examples, engine 10 may be omitted. Engine 10 may be started with an engine starting system shown in FIG. 1 or via integrated starter/generator (ISG) 240. ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 has a higher output torque capacity than starter 96 shown in FIG. 1. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive torque or a negative torque to powertrain 200 via operating as a motor or generator as instructed by electric machine controller 252.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates a fraction of the requested driver demand torque to the engine and the remaining fraction to the ISG. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Any portion of desired negative wheel torque that may not be provided by ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller 255 with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Thus, the system of FIGS. 1 and 2 provides for a system, comprising: an engine; a motor/generator; a motor/generator controller in electrical communication with the motor/generator; a disconnect clutch positioned in a powertrain between the engine and the motor; a transmission coupled to the motor/generator; and a vehicle system controller including executable instructions stored in non-transitory memory to align in time an estimated motor torque value and an actual motor torque value output via the motor/generator controller. The system includes where the vehicle system controller estimates the estimated motor torque. The system includes where the estimated motor torque value and the actual motor torque value output via the motor/generator controller are aligned in time via a predictor.

In some examples, the system further comprises additional instructions to determine an engine torque request. The system further comprises additional instructions to determine the estimated motor torque value based on a requested motor torque and a communications delay between a source requesting motor torque and a motor torque controller. The system further comprises additional instructions to add the estimated motor torque to an estimated engine torque to estimate driveline torque. The system further comprises additional instructions to adjusting a driveline actuator responsive to the estimated driveline torque.

Referring now to FIG. 3, example plots illustrating how vehicle communication system network delays may affect driveline torque are shown. The plots of FIG. 3 represent engine torque, motor torque, and driveline torque (e.g. motor torque plus engine torque) for uncompensated communications network delays. Vertical lines at times T0-T3 represent times of interest during the sequence. In this example, the vehicle system controller and the engine controller are in a same control unit while the motor controller is apart from the vehicle system controller and the engine controller. Communications between the vehicle system controller and the motor controller are via a CAN as shown in FIG. 1.

The first plot from the top of FIG. 3 is a plot of engine torque versus time. The vertical axis represents engine torque and engine torque increases in the direction of the vertical axis arrow. The horizontal axis represents time and time increases from the left side of the figure to the right side of the figure. Solid line 302 represents an engine torque command. Dashed line 304 represents actual engine torque based on the engine torque command 302. The time between the arrows at 303 represents actuator (e.g., the engine and actuators used to adjust engine torque) delay time.

The second plot from the top of FIG. 3 is a plot of motor torque versus time. The vertical axis represents motor torque and motor torque increases in the direction of the vertical axis arrow. The horizontal axis represents time and time increases from the left side of the figure to the right side of the figure. Solid line 310 represents a motor torque command received at the motor controller. Dashed line 308 represents actual motor torque based on the motor torque command 310 received at the motor controller. Dashed dot line 306 represents actual motor torque reported to the vehicle system controller. The time between the arrows at 309 represents a delay time from the a time the motor torque command is issued until a time the actual motor torque is reported to and received by the vehicle system controller.

The third plot from the top of FIG. 3 is a plot of driver demand torque. Driver demand torque is a basis for determining driveline torque. The vertical axis represents driver demand torque and driver demand torque increases in the direction of the vertical axis arrow. The horizontal axis represents time and time increases from the left side of the figure to the right side of the figure.

The fourth plot from the top of FIG. 3 is a plot of driveline torque (e.g., motor torque plus engine torque) versus time. The vertical axis represents driveline torque and driveline torque increases in the direction of the vertical axis arrow. The horizontal axis represents time and time increases from the left side of the figure to the right side of the figure. Solid line 312 represents driveline torque (e.g., sum of actual engine torque and actual motor torque) based on actual engine torque and actual motor torque reported by the respective engine and motor controllers to the vehicle system controller. Dashed line 314 represents driveline torque based on commanded engine torque and actual motor torque.

At time T0, the engine torque command and the actual engine torque are at a lower level. The commanded motor torque, actual motor torque, and reported actual motor torque are at a higher level. The driveline torque based on commanded motor torque and commanded engine torque and the driveline torque based on reported actual motor torque and actual engine torque are at a lower level.

At time T1, the commanded engine torque begins to increase without the commanded motor torque beginning to decrease. The motor torque command received at the motor controller does not begin to decrease because of an amount of time it takes for a motor command sent from the vehicle system controller to be received by the motor controller. The other control variables remain at a same level. These conditions may be in response to a state of battery charge being less than a threshold or other conditions.

At time T2, the motor command received by the motor controller begins to increase while the engine torque command continues to decrease. The other control variables remain at a same level. The amount of time between time T1 and time T2 is due to a communications time delay in the vehicle communication network between the vehicle system controller and the motor controller.

Between time T2 and time T3, the engine torque command and the actual engine torque continue to increase and then level off at constant higher values. The motor torque command received at the motor controller, the actual motor torque, and the actual motor torque reported to the system controller continue to decrease toward a final value. The driveline torque based on actual engine torque and actual motor torque reported by the respective engine and motor controllers to the vehicle system controller increases and then decreases near time T3.

At time T3, the motor torque commanded received at the motor controller reaches its final value, thereby completing the command sequence for the engine and the motor. The actual motor torque and the reported actual motor torque converge at the commanded motor torque shortly thereafter. The engine torque and driveline torque also approach final values.

Thus, in the time between time T2 and time T3, the driveline torque based on actual engine torque and actual motor torque reported to the vehicle system controller increases and then decreases, which may cause driveline torque disturbances and/or disturbances in other vehicle systems including the vehicle's transmission.

Referring now to FIG. 4, example plots illustrating how vehicle communication system network delays may be compensated to improve driveline torque estimation are shown. The plots of FIG. 4 are similar to the plots of FIG. 3. Vertical lines at times T10-T13 represent times of interest during the sequence. In this example, the vehicle system controller and the engine controller are in a same control unit while the motor controller is apart from the vehicle system controller and the engine controller. Communications between the vehicle system controller and the motor controller are via a CAN as shown 7676in FIG. 1.

The first plot from the top of FIG. 4 is a plot of engine torque versus time. The vertical axis represents engine torque and engine torque increases in the direction of the vertical axis arrow. The horizontal axis represents time and time increases from the left side of the figure to the right side of the figure. Solid line 402 represents an engine torque command. Dashed line 404 represents actual engine torque based on the engine torque command 402. The time between the arrows at 403 represents actuator (e.g., the engine and actuators used to adjust engine torque) delay time.

The second plot from the top of FIG. 4 is a plot of motor torque versus time. The vertical axis represents motor torque and motor torque increases in the direction of the vertical axis arrow. The horizontal axis represents time and time increases from the left side of the figure to the right side of the figure. Solid line 410 represents a motor torque command received at the motor controller. Dashed line 408 represents actual motor torque based on the motor torque command 410 received at the motor controller. Dashed dot line 406 represents estimated motor torque calculated within the vehicle system controller. If the motor controller has to report back to the vehicle system controller, there will be an additional CAN delay as shown in FIG. 3. The time between the arrows at 409 represents a delay time from the time the motor torque command is issued until a time the actual motor torque is realized by the motor controller. The actual torque reported back from the motor controller to the vehicle system controller will have an additional delay as shown in FIG. 3. Lines 406 and 408 are at a same level as line 410 when only line 410 is visible.

The third plot from the top of FIG. 4 is a plot of driver demand torque. Driver demand torque is a basis for determining driveline torque. The vertical axis represents driver demand torque and driver demand torque increases in the direction of the vertical axis arrow. The horizontal axis represents time and time increases from the left side of the figure to the right side of the figure.

The fourth plot from the top of FIG. 4 is a plot of driveline torque (e.g., motor torque plus engine torque) versus time. The vertical axis represents driveline torque and driveline torque increases in the direction of the vertical axis arrow. The horizontal axis represents time and time increases from the left side of the figure to the right side of the figure. Solid line 412 represents driveline torque (e.g., sum of actual engine torque and estimated motor torque) based on actual engine torque from the engine controller and estimated motor torque inside the vehicle system controller. Dashed line 414 represents driveline torque based on commanded engine torque and actual motor torque.

At time T10, the engine torque command and the actual engine torque are at a lower level. The commanded motor torque, actual motor torque, and reported actual motor torque are at a higher level. The driveline torque based on commanded motor torque and commanded engine torque and the driveline torque based on reported actual motor torque and actual engine torque are at a lower level.

At time T11, the commanded engine torque begins to increase without the commanded motor torque beginning to decrease. The motor torque command received at the motor controller does not begin to decrease because of an amount of time it takes for a motor command sent from the vehicle system controller to be received by the motor controller. The other control variables remain at a same level. These conditions may be in response to a state of battery charge being less than a threshold or other conditions.

At time T12, the motor command received by the motor controller begins to decrease while the engine torque command continues to increase. The other control variables remain at a same level. The amount of time between time T11 and time T12 is due to a communications time delay in the vehicle communication network between the vehicle system controller and the motor controller.

Between time T12 and time T13, the engine torque command and the actual engine torque continue to increase and then level off at constant higher values. The motor torque command received at the motor controller, the actual motor torque, and the estimated motor torque reported in the vehicle system controller continue to decrease toward a final value. The actual motor torque and the estimated motor torque reported in the vehicle system controller are substantially same values (e.g., within 5% of each other) such that the delay in the actual motor torque reported to the system controller is reduced. In other words, the actual motor torque and estimated motor torque reported to the vehicle system controller are aligned in time. The driveline torque based on actual engine torque and actual motor torque reported by the respective engine and motor controllers to the vehicle system controller increases a smaller amount as compared to the same variable between times T2 and T3 in FIG. 3.

At time T13, the motor torque commanded received at the motor controller reaches its final value. The command sequence for the engine and the motor is complete. The actual motor torque and the reported actual motor torque converge at the commanded motor torque shortly thereafter. The engine torque and driveline torque also approach final values.

Thus, in the time between time T12 and time T13, the driveline torque based on actual engine torque and actual motor torque reported to the vehicle system controller increases only a small amount so that actuators, devices, and systems using the driveline torque value may not be disturbed significantly.

Referring now to FIG. 5, an example block diagram of a control system to compensate for communication delays in a driveline torque control system is shown. The control system of FIG. 5 may be incorporated as executable instructions stored in non-transitory memory of the system shown in FIGS. 1 and 2. Further, the block diagram may describe programming and devices in the physical world.

Block 503 represents the vehicle engine and its controller. Block 502 represents an engine torque request that is provided within the powertrain vehicle torque control module 550 and which may be included in the vehicle system controller. Block 504 represents a vehicle motor and its controller. Block 506 represents a motor torque request that is provided within the powertrain vehicle torque control module 550. Block 508 is a model of the motor and block 510 is a model of the CAN delay. Block 512 is a low pass filter or alternatively a proportional/integral controller. Junctions 522, 524, and 526 preform addition and subtraction of values input into the respective junctions. Finally, block 520 represents a CAN delay.

In one example, the engine torque request and the motor torque request are based on a driver requested powertrain wheel torque or power amount. Vehicle accelerator pedal position is converted into a requested powertrain wheel torque or power amount. The requested powertrain wheel torque or power amount is partitioned into the engine torque request and the motor torque request. The partitioning of engine torque and motor torque may be based on a map of engine brake fuel consumption and battery state of charge. For example, the engine may be operated at a speed and load where engine fuel efficiency is greater than a threshold efficiency. If the engine is operated at the fuel efficient conditions and engine power delivered through the transmission and remaining powertrain components would be greater than the requested wheel torque, the motor may operate as a generator to provide electrical energy to charge a battery so that the desired wheel torque may be provided. Alternatively, if the engine is operated at the fuel efficient conditions and engine power delivered through the transmission and remaining powertrain components would be less than the requested wheel torque, the motor may operate to provide additional power to the powertrain so that the desired wheel torque may be provided. In one example, the powertrain torque may be allocated according to the following equation: $T_{DD}=T_{ENG}*k1+T_{MOT}*k2$, where $T_{DD}$ is driver demand for a request powertrain power, $T_{ENG}$ is engine torque, and $T_{MOT}$ is motor torque, and k1, k2 are constants for any gearing between the motor and engine.

The motor torque request is provided from block 506 to block 504 via CAN 520. In this example, the engine controller is within the vehicle system controller so the engine torque request does not pass through CAN 520. However, if engine torque passes through CAN 520 compensation for engine torque may be provided via blocks similar to 508, 510, 512, 522, and 524, except the motor model of block 508 is replaced with an engine model. The motor torque request is implemented via components of block 504 and the engine torque request is implemented via components of block 503.

Actual engine torque is provided to summing junction 526 via block 503. Actual motor torque is provided to summing junction 524 via block 504 and block 520. The motor torque request is also input to a motor torque model. In one example, the motor torque model is expressed as: $Tm=f(T_{m,cmd})$ where f is a transfer function and/or rate limits.

The motor torque model outputs an estimated motor torque and it is provided to block 510 and block 522. Block 510 modifies the estimated motor torque by delaying the estimated motor torque by an amount equal to the CAN delay. The delayed estimated motor torque is subtracted from the actual motor torque provided from block 504 and block 520 at block 524. The result is filtered or input to a proportional/integral controller at block 512. The output of block 512 is added to the estimated motor torque from block 508 at block 522. The CAN delay compensated motor torque is provided by block 522 to block 526 where it is added to the actual engine torque to provide estimated driveline torque.

Figure 6:
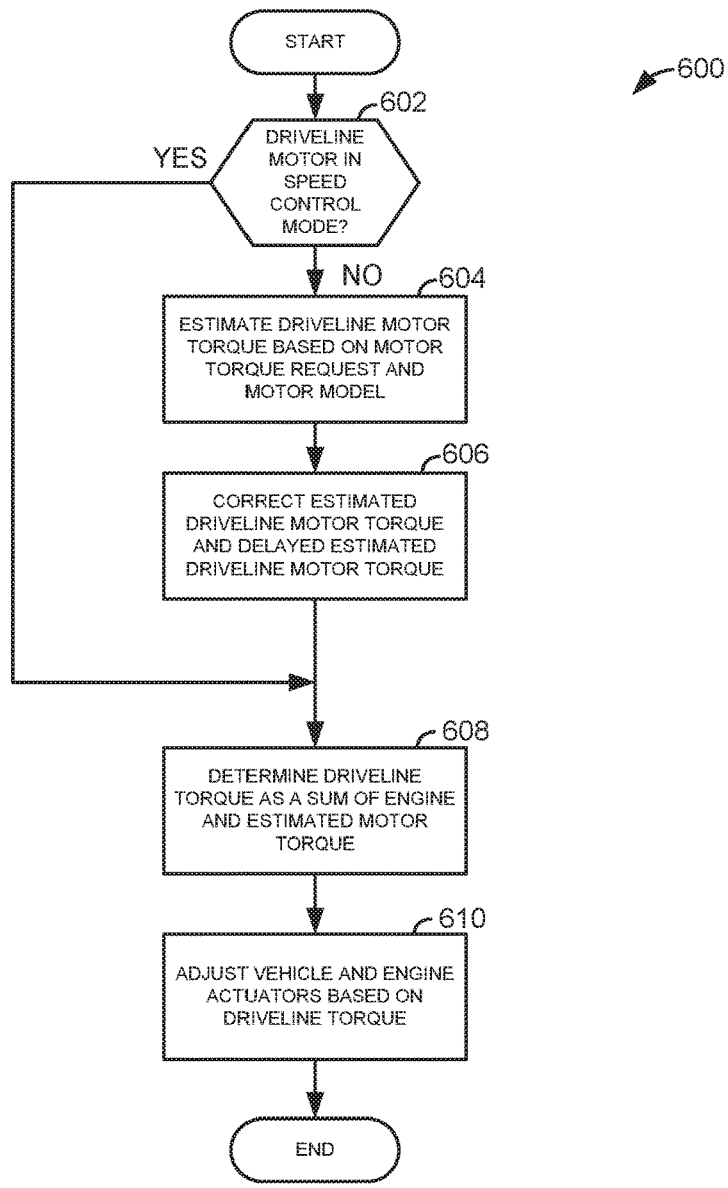
FIG. 6 shows an example flow chart for driveline torque control compensation.

Referring now to FIG. 6, an example flow chart for compensating CAN communication delays in a vehicle torque control system is shown. The method of FIG. 6 may be incorporated and may operate in cooperation with the system of FIGS. 1 and 2. Further, at least portions of the method of FIG. 6 may be incorporated as executable instructions stored in non-transitory memory while other portions of the method may be performed via a controller transforming operating states of devices and actuators in the physical world.

At 602, method 600 judges if the driveline motor is in a speed control mode. The driveline motor torque may be varied to provide a desired driveline motor speed in a speed control mode. Alternatively, the driveline motor may be controlled in a torque control mode where driveline motor speed varies and driveline motor torque is a desired driveline motor speed. Method 600 may judge that the driveline motor is in a speed control mode based on a value of a variable in memory that indicates the driveline motor control mode. If method 600 judges that the driveline motor is in a speed control mode, the answer is yes and method 600 proceeds to 608. Otherwise, the answer is no and method 600 proceeds to 604.

At 604, method 600 estimates a driveline motor torque based on a motor torque request and a motor model. In one example, the driveline motor torque is estimated according to the following equation:

$$\tau_{mtr}^{est} = f(\tau_{mtr}^{req})$$

where $\tau_{mtr}^{est}$ is the estimated motor torque, $\tau_{mtr}^{req}$ is the requested motor torque and $f(.)$ is the motor model transfer function. Method 600 proceeds to 606 after motor torque is estimated.

At 606, method 600 corrects the estimated driveline motor torque for the CAN communication delay. The estimated motor torque $\tau_{mtr}^{est}$ is corrected via the actual motor torque $\tau_{mtr}^{actl}$ provided by the motor controller 252 shown in FIG. 2 which is a time delayed version of estimated motor torque. The estimated motor torque is compensated via the following equations:

$$error = z^{-d}\tau_{mtr}^{est} - \tau_{mtr}^{actl}$$

$$\tau_{mtr}^{est,corr} = \tau_{mtr}^{est} + g(error)$$

where $\tau_{mtr}^{est,corr}$ is the corrected estimate of motor torque, $g(.)$ is a transfer function that can be either low pass filter, or a proportional and integral controller, or a combination of both, $z^{-d}$ is the digital domain z operator and it denotes the time shift of the CAN by d time steps. In one example, the communications delay is an amount of time between a starting time a control variable value is sent over a controller area network from the vehicle system controller and a ending time a control variable value is received at a motor controller from over the controller area network. Method 600 proceeds to 608 after the estimated motor torque is corrected.

At 608, method 600 determines estimated driveline torque. The estimated driveline torque is the sum of the corrected estimated torque and the estimated engine torque. The estimated engine torque may be determined from a table or a function that outputs estimated engine torque based on engine speed and airflow. Method 600 proceeds to 610 after the estimated driveline torque is output.

At 610, method 600 adjusts vehicle actuators in response to the driveline torque. Transmission shifting may be initiated based on the driveline torque. For example, the transmission may be downshifted from a higher gear to a lower gear in response to a driveline torque greater than at threshold. Further, the motor torque may be adjusted responsive to the driveline torque to feedback control driveline torque. Likewise, engine torque may be adjusted via an engine torque actuator responsive to the driveline torque. Additionally, operation of the transmission torque converter clutch may be adjusted responsive to the driveline torque. Method 600 proceeds to exit after vehicle actuators are adjusted.

Thus, the method of FIG. 6 provides for a powertrain operating method, comprising: estimating a motor torque based on a requested motor torque and a communications delay between a source requesting motor torque and a motor torque controller; adding the estimated motor torque to an estimated engine torque to estimate driveline torque; and adjusting a driveline actuator responsive to the estimated driveline torque. The method includes where the requested motor torque is based on a driver demand torque. The method includes where the estimated engine torque is based on engine speed and engine airflow. The method includes where the communications delay is an amount of time between a starting time a control variable value is sent over a controller area network and a ending time a control variable value is received over the controller area network. The method includes where the driveline actuator is a transmission clutch or an engine torque actuator. The method includes where the estimated motor torque is based on output of a transfer function.

The method of FIG. 6 also provides for a powertrain operating method, comprising: estimating a motor torque based on a requested motor torque and a communications delay between a source requesting motor torque and a motor torque controller; correcting the estimated motor torque based on an actual motor torque and a time delayed estimated motor torque; adding the corrected motor torque to an estimated engine torque to estimate driveline torque; and adjusting a driveline actuator responsive to the estimated driveline torque. The method includes where the corrected estimated motor torque is further based on an error determined from the time delayed estimated motor torque and the actual motor torque. In some examples, the method includes where the error is filtered via a low pass filter. The method also includes where the error is input to proportional/integral controller. The method includes where the driveline actuator is a torque converter lock up clutch. The method includes where the driveline actuator is an engine torque actuator. The method includes where the communications delay is an amount of time between a starting time a control variable value is sent over a controller area network and an ending time a control variable value is received over the controller area network.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:
1. A powertrain operating method, comprising:
   estimating a motor torque via a controller based on a requested motor torque and a motor model;

correcting the estimated motor torque via adding a low pass filtered error value to the estimated motor torque, where the low pass filtered error value is equal to a digital domain operator multiplied by the estimated motor torque minus an actual motor torque, and where the low pass filtered error value includes a communications delay, and where the communications delay is an amount of time between a starting time a control variable value is sent over a controller area network and an ending time a control variable value is received over the controller area network;

adding the corrected estimated motor torque to an estimated engine torque to estimate driveline torque via the controller; and adjusting a driveline actuator responsive to the estimated driveline torque via the controller.

2. The method of claim 1, where the requested motor torque is based on a driver demand torque.

3. The method of claim 2, where the estimated engine torque is based on engine speed and engine airflow.

4. The method of claim 1, where the driveline actuator is a transmission clutch or an engine torque actuator.

5. The method of claim 1, where the estimated motor torque is based on output of a transfer function.

6. A powertrain operating method, comprising:
via a controller, estimating a motor torque based on a requested motor torque and a motor model;
correcting the estimated motor torque via adding an error value that has been low pass filtered to the estimated motor torque, the error value being equal to a digital domain operator multiplied by the estimated motor torque minus an actual motor torque;
adding the corrected estimated motor torque to an estimated engine torque to estimate driveline torque via the controller; and
adjusting a driveline actuator responsive to the estimated driveline torque via the controller.

7. The method of claim 6, where the estimated motor torque is corrected for a controller area network communications delay.

8. The method of claim 7, where the controller area network communications delay is an amount of time between a starting time a control variable is sent over a controller area network from a vehicle system controller and an ending time a controller variable value is received at a motor controller.

9. The method of claim 7, further comprising inputting the error value to a proportional/integral controller.

10. The method of claim 6, where the driveline actuator is a torque converter lock up clutch, and where the digital domain operator denotes a time shift of a controller area network (CAN) by d time steps.

11. The method of claim 6, where the driveline actuator is an engine torque actuator.

12. A system, comprising:
an engine;
a motor/generator;
a motor/generator controller in electrical communication with the motor/generator;
a disconnect clutch positioned in a powertrain between the engine and the motor/generator;
a transmission coupled to the motor/generator; and
a vehicle system controller including executable instructions stored in non-transitory memory to align in time an estimated motor torque value and an actual motor torque value output via the motor/generator controller, the estimated motor torque value based on a motor model and a requested motor torque, and additional executable instructions to correct the estimated motor torque value via adding an error value that has been low pass filtered to the estimated motor torque value, the error value being equal to a digital domain operator multiplied by the estimated motor torque value minus the actual motor torque value.

13. The system of claim 12, further comprising additional executable instructions to determine the estimated motor torque value.

14. The system of claim 12, where the estimated motor torque value and the actual motor torque value output via the motor/generator controller are aligned in time via a predictor.

15. The system of claim 12, further comprising additional instructions to determine an engine torque request.

16. The system of claim 12, further comprising additional instructions to add the estimated motor torque value to an estimated engine torque to estimate driveline torque.

17. The system of claim 16, further comprising additional instructions to adjust a driveline actuator responsive to the estimated driveline torque.

* * * * *